(12) United States Patent
Ash et al.

(10) Patent No.: US 6,511,310 B1
(45) Date of Patent: Jan. 28, 2003

(54) INJECTION MOLDING METHOD AND APPARATUS WITH IMPROVED CLAMPING UNIT

(75) Inventors: Charles E. Ash, Perrysburg, OH (US); John H. Gillen, Ottawa Lake, MI (US)

(73) Assignee: Libbey-Owens-Ford Co., Toledo, OH (US)

( * ) Notice: Subject to any disclaimer, the term of this patent is extended or adjusted under 35 U.S.C. 154(b) by 100 days.

(21) Appl. No.: 09/603,859

(22) Filed: Jun. 26, 2000

Related U.S. Application Data
(60) Provisional application No. 60/143,116, filed on Jul. 9, 1999.

(51) Int. Cl.[7] ............................................. B29C 45/17
(52) U.S. Cl. ..................... 425/190; 425/129.1; 425/595
(58) Field of Search ............................... 425/190, 129.1, 425/589, 595

(56) References Cited

U.S. PATENT DOCUMENTS

| 3,259,943 A | | 7/1966 | Kovach et al. |
|---|---|---|---|
| 3,396,431 A | | 8/1968 | Kovach et al. |
| 4,160,636 A | * | 7/1979 | Magherini ................ 425/129.1 |
| 4,440,377 A | | 4/1984 | Hujik |
| 5,033,955 A | * | 7/1991 | Faig et al. ................... 425/589 |
| 6,123,535 A | | 9/2000 | Ash et al. |

FOREIGN PATENT DOCUMENTS

| JP | 03007314 A | 1/1991 |
|---|---|---|
| JP | 05237875 A | 9/1993 |
| JP | 06155476 A | 6/1994 |
| WO | WO 00/34021 A | 6/1994 |
| WO | WO 98/05487 A | 2/1998 |

* cited by examiner

*Primary Examiner*—James P. Mackey
(74) *Attorney, Agent, or Firm*—Marshall & Melhorn, LLC

(57) ABSTRACT

An improved method and apparatus for injection molding is shown which utilizes an injection molding or plasticizing unit in combination with a novel detachable clamping unit to provide a readily interchangeable clamping unit having easy access to both halves of the injection mold.

10 Claims, 2 Drawing Sheets

INJECTION MOLDING METHOD AND APPARATUS WITH IMPROVED CLAMPING UNIT

This application is claiming the benefit, under U.S.C. §119(e), of the provisional application filed Jul. 9, 1999 under 35 U.S.C. §111(b), which was granted a Ser. No. 60/143,116. The provisional application, No. 60/143,116, is hereby incorporated by reference.

BACKGROUND OF THE INVENTION

1. Field of the Invention

The present invention relates to an improved apparatus for injection molding of thermoplastic materials. More particularly, the present invention relates to an improved apparatus for injection molding having an improved clamping unit with fully accessible molding dies. Most particularly, the present invention relates to an improved apparatus for injection molding which comprises an injection molding or plasticizing unit in combination with a novel detachable clamping unit to provide a readily interchangeable clamping unit having easy access to both halves of the injection mold.

2. Discussion of the Related Art

Injection molding has long been a preferred method of molding where high production rates, fully automatic operation, and reduced material costs are considerations. Further, a wide range and combination of colors can be molded. Materials customarily molded by the injection method includes cellulose acetates, cellulose acetatebutyrate, polystyrene, polyvinyl chloride, acrylic and vinylide chlorides.

The presently known injection molding machine consists of two basic components. The injection or plasticizing unit, and the clamping unit. The injection unit is where the raw material, usually in pellet form, is converted, melted, or plasticized to a condition where it can be injected into the mold. A reciprocating screw is used to convey the material to the front of the screw. Once the material has collected in front of the screw, hydraulic pressure forces the sprue forward, thereby injecting the plastic into the mold.

The clamping unit is the mechanism on which the molding dies are mounted, and applies the force to the mold during the injection cycle to prevent the molds from being forced apart. Injection molding pressures can exceed 30,000 pounds per square inch, so the clamp must be able to maintain high pressure in order to keep the mold closed during injection.

Injection molding machines are widely known in the art. Commonly used injection molding machines are those available from Hettinga Equipment, Inc., Des Moines, Iowa 50332, Cincinnati Milicron, Batavia, Ohio 45103, Husky Injection Molding Systems, Inc., Bolton Ontario, Canada L7E, 5S5, and Toshiba Machine Company of America, Elk Grove Village, Ill. 60007.

However, in spite of their popularity, injection molding machines have certain disadvantages because of their large size and the high pressures used in injection molding. This has led to rather large, high cost units with fairly inaccessible molding dies. Even though injection molding may be favored for certain applications the fact that the dies are not easily accessible or interchangeable limits such application.

Also, because injection molding machines are rather large, and not easily moveable, they are usually located some distance away from the end user of injection molded parts. They are not easily located near the end user, or on a production line, for example.

In addition, since the injection molding apparatus includes a moving platen and a stationary platen, the mold parts are in a closely spaced, opposed, relationship, and such injection molding machines can not easily be used for other than the making of an entire thermoplastic part. For example, they can not easily be used for molding, for example, a polyvinyl chloride part onto a sheet of material, because the sheet of material can not easily be inserted in the mold cavity.

Thus, those skilled in the art have continued to search for a way to provide an injection molding unit which is lighter, of a smaller size, has full access to the molding dies, can "mold onto" another part, can be used at or near the point of need, and has easily changeable or interchangeable clamping units to provide for quick changeover between parts with minimal downtime of the injection or plasticizing unit.

SUMMARY OF THE INVENTION

The aforementioned problems are addressed in accordance with the present invention by replacing the known clamping units available in the injection molding units available from the aforementioned manufacturers with a horizontal booking press to provide a novel apparatus and method not heretofore found in the prior art.

In one embodiment of the invention, a horizontal booking press is connected to a plasticizing or injection molding unit.

In a further embodiment of the invention, the horizontal booking press has a moving or moveable mold platen which may hold, or have affixed to, or carry a base portion of a mold or molds. A second or door platen may hold, have affixed to, or carry a core or cavity portion of a mold or molds. The second or door platen is hingedly mounted to swing open and closed like a cover of a book with respect to the moveable mold platen.

In a still further embodiment of the invention the moveable mold platen is reciprocated by means known in the art.

In a still further embodiment of the invention the moveable mold platen is reciprocated or moved by a rack and pinion arrangement.

In a still further embodiment of the invention the moveable mold platen is reciprocated or moved by a ball screw arrangement.

In a still further embodiment of the invention, an injection molding apparatus of the foregoing nature is provided in which the horizontal booking press is light in weight and easily moveable from place to place as needed.

In a further embodiment of the present invention, an injection molding apparatus of the foregoing nature is provided wherein the whole horizontal booking press is interchangeable with other horizontal booking presses as needed.

In another embodiment of the invention a selfcontained injection molding apparatus of the foregoing nature is provided.

Thus, one of the objects of the present invention is to provide a novel molding method and apparatus for injection molding a part.

Another object of the present invention is to provide an injection molding apparatus which has fully accessible mold portions.

Another object of the present invention is to provide a portable, self-contained injection molding apparatus which may produce a part at the site where it is needed, or sufficiently nearby, to essentially save the cost of shipping manufactured parts to the site.

Another object of the present invention is to provide an injection molding apparatus which can injection mold plastic parts onto other parts which may be inserted into the fully accessible mold or mold portion or portions.

Further object and advantages of the present invention will be apparent from the following description and appended claims, reference being made to the accompanying drawings forming a part of the specification, wherein like reference characters designate corresponding parts in the several views.

Figure 1:
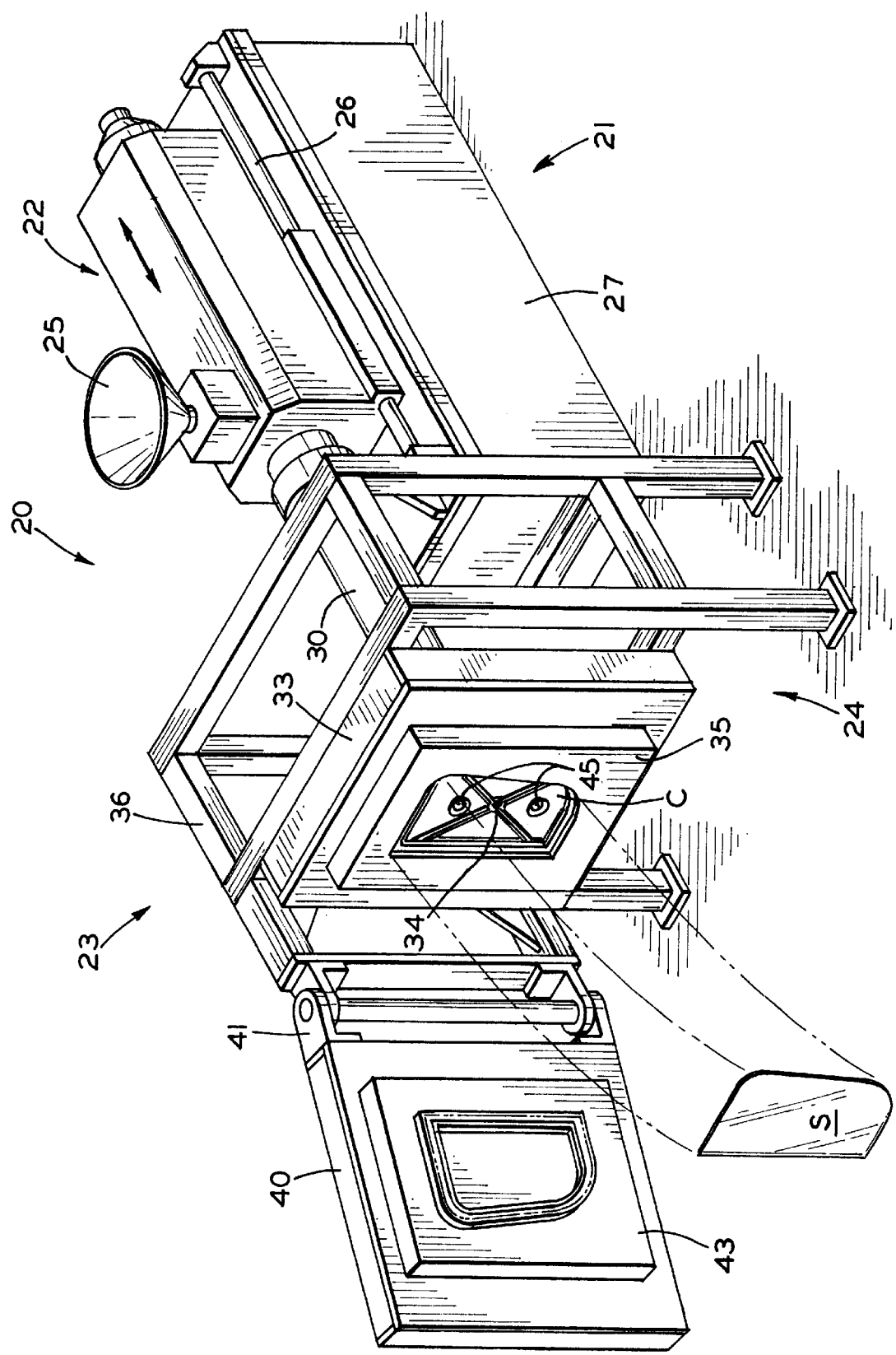
FIG. 1 is a perspective view of a construction embodying the present invention.
Figure 2:
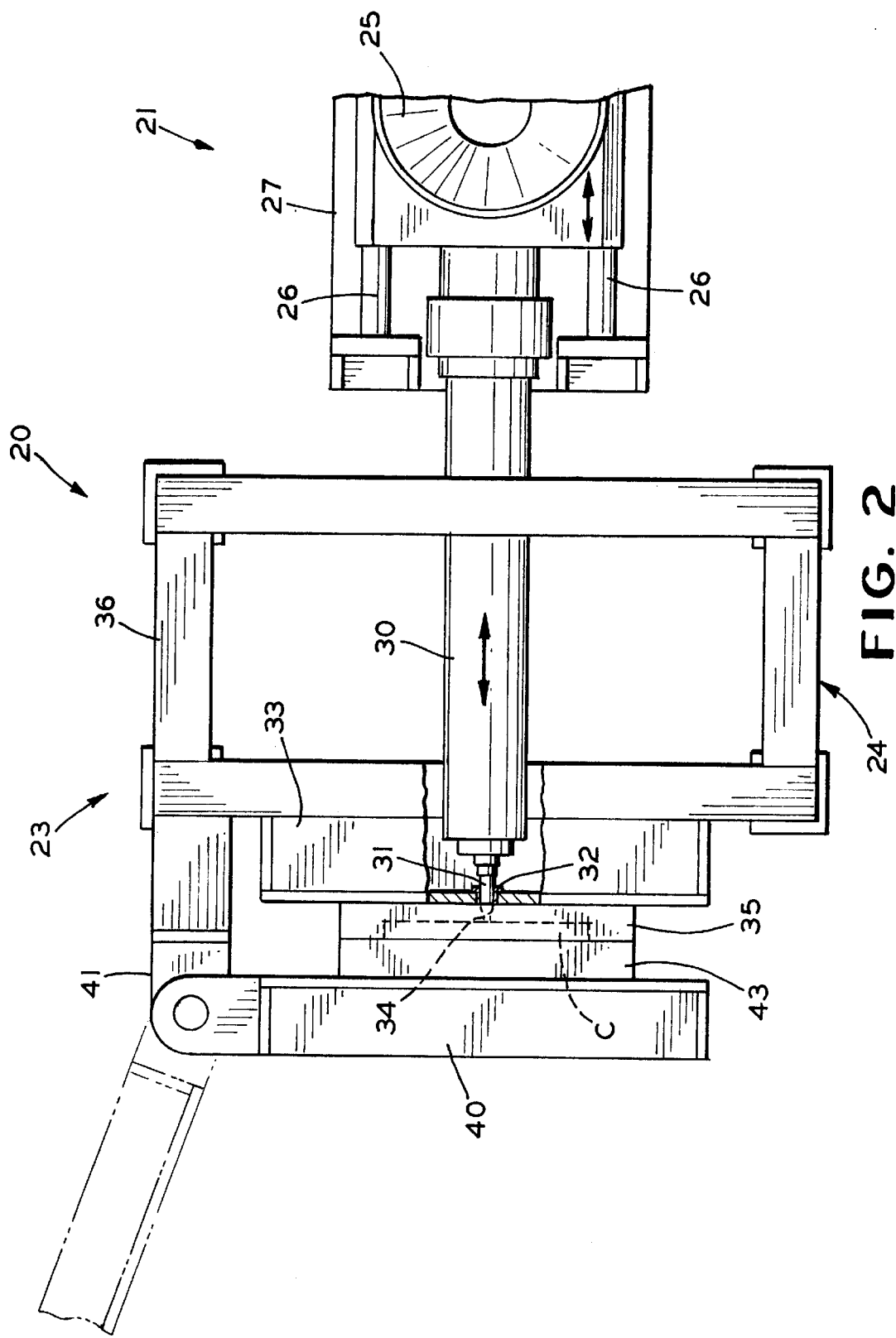
FIG. 2 is a plan view, partially broken away, of the construction shown in FIG. 1.

It is to be understood that the present invention is not limited in its application to the details of construction and arrangement of parts illustrated in the accompanying drawings, since the invention is capable of other embodiments, and being practiced or carried out in various ways within the scope of the claims. Also, it is to be understood that the phraseology and terminology employed herein is for the purpose of description, and not of limitation.

DESCRIPTION OF THE PREFERRED EMBODIMENT

In order to solve the aforementioned problems in the prior art injection molding units, applicants have replaced the clamping units in the injection molding units available in the prior art with horizontal booking presses, also known in the art.

As previously noted, prior injection molding machines have been large, heavy and not readily moveable except, for example, by overhead cranes, or the like. The injection molding unit of the subject injection molding apparatus weighs, on the order of, 10,000–12,000 pounds. A typical clamping unit which may be joined with the injection molding unit weighs, on the order of, 15,000–17,000 pounds. Thus, each component of the subject injection molding unit, or the components connected together may be moved by a standard forklift truck which is used in manufacturing facilities. Such forklift trucks typically have a lifting capacity of at least 30,000 pounds.

Horizontal booking units are available from Con-Tek Machine, Inc., St. Paul, Minn. 55110; Cannon USA, Mars, Pa. 16046; and Hi-Tech Engineering Company, Grand Rapids, Mich. 49512. These horizontal booking presses may be permanently connected to the injection or plasticizing unit in the injection molding apparatus, or may be separate and used with a stand alone injection molding units.

In the preferred embodiment to be described below the horizontal booking press is mounted in a fixed relationship to a stand alone injection molding unit. Both units, for example, may be separately connected to the factory floor, or the units may be connected to each other. In either case, the horizontal booking press should be removably connected so that the booking presses may be quickly interchangeable to provide for a quick change over in the parts being produced with minimal down time of the stand alone injection molding unit. In addition to, or as an alternative, the injection molding dies should be quickly and easily mountable and demountable from their platens.

More specifically, the injection molding unit of the present invention may be disconnected from one clamping unit and replaced with a second clamping unit in less than 45 minutes, or if such operation is performed by experienced personnel, such a changeover in clamping units may be accomplished in less than 30 minutes.

Further, the fixed and complimentary molds may be demounted from the fixed platen and door platen, respectively, and fixed and complimentary mold, one or both of which may be different from the molds removed, mounted in their place on the fixed and door platens in less than 30minutes. This time is substantially less than the 60 minutes required for mold replacement on conventional presses.

Referring now to FIG. 1, there is shown in improved injection molding apparatus 20 embodying the present invention. The injection molding apparatus 20 will have an injection or plasticizing unit 21, such as a stand alone injection molding unit 22, and a clamping unit 23 such as the horizontal booking press 24. The stand alone injection molding unit 22 has a feed hopper 25 and other associated apparatus which reciprocates on rails 26 mounted to the base 27 of the injection molding unit 22.

Attached to the feed hopper and related apparatus is reciprocating barrel and screw assembly 30. An injection nozzle 31 is mounted to the barrel and screw assembly 30. Thus, the injection or plasticizing unit 21 comprises mainly the feed hopper 25, a reciprocating screw and barrel assembly 30, and the nozzle 31. The nozzle 31 connects the barrel to the sprue bushing 32. The sprue bushing 32 is mounted to the fixed platen 33, and is in fluid communication through the sprue 34 with the mold cavity C in fixed mold 35. Fixed mold 35 is mounted to frame 36 of the stand alone injection molding unit 22. The frame 36 may be fixedly mounted to the factory floor in a fixed relationship to the base 27, or may be connected by suitable means to the base 27.

Moving or door platen 40 is connected by means of a hinge 41 to the frame 36 of the horizonal booking press 24. The hinge 41 is positioned so that the door platen 40 moves in relationship to the fixed platen 30 like the cover of a book opens and closes with respect to the rest of the book. This provides that the door platen 40 may rotate 180° or more, and preferably at least 90°, with respect to the fixed platen 33. The moving or door platen 40 may be manually operated or may be opened or closed by any suitable means known in the art. As with the injection molding unit 22, the control systems associated with the horizontal booking press 24 are well known in the art, and need not be described in detail herein.

Mounted to the door platen 40 is a complimentary shaped mold portion 43. The door platen 26, and thus the complimentary shaped mold portion 43, closes into position above the fixed mold 35 mounted to the fixed platen 33. In the preferred embodiment, because of the fully accessible nature of the mold cavity C in the fixed mold 35, a sheet of material S may be inserted into the mold cavity C and be held in place by vacuum heads 45 before the door platen 40 swings shut. The sheet S may fully or partially fill the mold cavity C. It should also be understood that the sheet S is not necessary, and the mold cavity C may be such as to form a thermoplastic part without molding that part onto another object such as sheet S.

In operation the nozzle 31 will be retracted from the sprue bushing 32, and the door platen 40, and thus, the complimentary shaped mold portion 43, will be rotated away from the sixth mold portion 35. A sheet of material S, such as glass, will be placed in the mold cavity C and held in place by vacuum head 45. Door platen 40 will be closed, bringing mold portion 43 into a closed relationship with fixed mold 35. Nozzle 31 will then advance into sprue bushing 32 and connect the nozzle 31 through the sprue 34 with the mold cavity C. Injection molding material will be injected into mold cavity C to injection mold a part onto sheet S. Fixed mold 35 may be heated and/or cooled during the injection molding process in a manner well known in the art. Nozzle 31 will be retracted, door platen 40 will opened, and sheet S will be removed with the injection molded part formed thereon.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An improved compact injection molding apparatus comprising:
   a) a compact plasticizing unit, and
   b) a compact clamping unit connected to said plasticizing unit, said clamping unit comprising a horizontal booking press.

2. An improved compact injection molding apparatus comprising:
   a) a compact injection unit, and
   b) a compact clamping unit connected to said injection unit, said clamping unit comprising a horizontal booking press connected to said compact injection unit.

3. An improved compact injection molding apparatus comprising:
   a) a compact injection unit, and
   b) a compact clamping unit connected to said compact injection unit, said clamping unit comprising a horizontal booking press, said horizontal booking press being separate and distinct from said injection unit and mounted in a fixed relationship thereto.

4. The injection molding apparatus defined in claim 3, wherein said injection unit weighs less than 12,000 pounds and is capable of being lifted by a forklift truck having a lifting capacity of at least 30,000 pounds.

5. The injection molding apparatus defined in claim 3, said injection unit further comprising:
   a) a base on which rails are mounted,
   b) a feed hopper mounted on said rails for reciprocating movement,
   c) a reciprocating barrel and screw assembly attached to said feed hopper,
   d) an injection nozzle mounted to said reciprocating barrel and screw assembly, said injection nozzle connecting said barrel to a sprue bushing, when said barrel and process assembly is in its extended portion,
   e) said sprue bushing connected to a fixed platen and in fluid communication with a mold cavity in a fixed mold, through a sprue, plasticized material being injected into said mold through said sprue,
   f) said fixed mold being mounted to said fixed platen which is mounted to a frame which supports said injection unit; and
   g) said frame being in a fixed relationship with the factory floor.

6. The injection molding apparatus defined in claim 5, said injection unit being rapidly, exchangeably connected to said clamping unit.

7. The improved injection molding apparatus of claim 3, said clamping unit further comprising:
   a) a fixed platen mounted on a frame,
   b) a fixed mold attached to said fixed platen,
   c) a hinge connected to said frame,
   d) a door platen swingingly attached to said hinge in at least two locations, proximate the top and bottom of said door platen,
   e) a complementary mold portion securely mounted on said door platen, where, upon swinging movement of said platen toward said fixed platen, said fixed mold, and said complimentary mold portion are brought into intimate contact, forming a mold cavity.

8. The injection molding apparatus of claim 7, wherein said clamping unit weighs less than 17,000 pounds and is capable of being lifted by a forklift truck having a lifting capacity of at least 30,000 pounds.

9. The injection molding apparatus of claim 7, wherein said fixed mold and said complementary mold portion may be removed from said fixed platen and said door platen and a different fixed mold and complementary mold portion inserted into said fixed platen and said door platen in less than 30 minutes.

10. The improved injection molding apparatus defined in claim 1, wherein said clamping unit and said injection unit, in connected relationship, weigh less than 30,000 lbs and are capable of being lifted by a forklift truck having a lifting capacity of at least 30,000 pounds.

* * * * *